United States Patent
Kopp et al.

(10) Patent No.: US 8,654,611 B2
(45) Date of Patent: Feb. 18, 2014

(54) METHOD FOR DETECTING SUBSTANTIALLY PERIODIC SERIES OF BURSTS OF SUBSTANTIALLY SINUSOIDAL SIGNALS

(75) Inventors: Laurent Kopp, Vallauris (FR); Michel Eyries, La Colle sur Loup (FR)

(73) Assignee: IXWaves SARL, Brest (FR)

( * ) Notice: Subject to any disclaimer, the term of this patent is extended or adjusted under 35 U.S.C. 154(b) by 0 days.

(21) Appl. No.: 13/381,212

(22) PCT Filed: Jun. 2, 2010

(86) PCT No.: PCT/EP2010/057750
§ 371 (c)(1),
(2), (4) Date: May 25, 2012

(87) PCT Pub. No.: WO2011/000660
PCT Pub. Date: Jan. 6, 2011

(65) Prior Publication Data
US 2012/0281508 A1     Nov. 8, 2012

(30) Foreign Application Priority Data
Jun. 29, 2009   (FR) .................................. 09 03157

(51) Int. Cl.
*G01S 3/80*   (2006.01)
(52) U.S. Cl.
USPC ........................................................ 367/127
(58) Field of Classification Search
USPC ........................................................ 367/127
See application file for complete search history.

(56) References Cited

U.S. PATENT DOCUMENTS

| | | | |
|---|---|---|---|
| 3,992,692 A | 11/1976 | Filer | |
| 4,951,263 A | 8/1990 | Shope | |
| 6,501,705 B1 * | 12/2002 | Molini et al. | 367/135 |
| 2007/0185654 A1 * | 8/2007 | Kervern | 702/5 |
| 2012/0281508 A1 * | 11/2012 | Kopp et al. | 367/127 |

FOREIGN PATENT DOCUMENTS

| | | | |
|---|---|---|---|
| EP | 0348363 A2 | 12/1989 | |
| FR | 2947341 A1 * | 12/2010 | G01S 3/802 |
| WO | 01/98796 A2 | 12/2001 | |
| WO | 2005/124386 A1 | 12/2005 | |

OTHER PUBLICATIONS

Baxley P A et al.: "Automated matched-field tracking in shallow water 2000 IEEE international symposium," Oceans 2000 MTS/IEEE Conference and Exhibition Sep. 11-14, 2000, Piscataway, NJ, USA, IEEE, vol. 2, Sep. 11, 2000, pp. 869-875.

* cited by examiner

*Primary Examiner* — Daniel Pihulic
(74) *Attorney, Agent, or Firm* — Baker & Hostetler LLP

(57) ABSTRACT

A method for detecting series of substantially periodic bursts of substantially sinusoidal signals, in particular, but not exclusively, series of bursts of signals transmitted recurrently (by pingers for example), this method making it possible to ensure the quick and reliable detection of such signals in the presence of significant interference noise. This method includes slightly delayed processing of received signals, spectral analysis and time integration, and presentation of the results in the form of a two-dimensional image of the successive recurrences of the bursts according to time slots of the received signals.

6 Claims, 4 Drawing Sheets

METHOD FOR DETECTING SUBSTANTIALLY PERIODIC SERIES OF BURSTS OF SUBSTANTIALLY SINUSOIDAL SIGNALS

CROSS-REFERENCE TO RELATED APPLICATIONS

This application is a National Stage of International patent application PCT/EP2010/057750, filed on Jun. 2, 2010, which claims priority to foreign French patent application No. FR 09 03157, filed on Jun. 29, 2009, the disclosures of each of which are incorporated by reference in their entireties.

FIELD OF THE DISCLOSED SUBJECT MATTER

The present invention relates to a method for detecting series of substantially periodic bursts of substantially sinusoidal signals.

BACKGROUND

A recent accident in June 2009 (Rio-Paris flight AF 447) highlighted the problem of searching in a limited time for "black boxes" (onboard flight recorders) submerged following the destruction of the aircraft above the sea. This search was done by detection, using a submerged sensor, of the signals transmitted by the "pingers" (transmitters) of these black boxes. Such signals consist of a carrier, theoretically sinusoidal (the oscillator producing it is not very stable) chopped in a substantially periodical manner (nor is the chopping very stable). The result is a series of "bursts" of substantially sinusoidal oscillations with a rectangular envelope. Signals of this type are also encountered in the reception of sonars or of radar signals.

By way of illustration, the conventional "pingers" of the onboard flight recorders used in aeronautics will be described here. These "pingers" are small transmitters which transmits, for a duration of around 30 days, acoustic signals with a sinusoidal carrier (with a frequency of 37.5 KHz in the case of the black boxes of AF447), the duration of which is of the order of 10 ms, at a repetition rate of the order of a second, in order to be as sparing as possible with the power supply source of the pingers. These pingers start working on contact with the water. The transmitted signal (a series that is uninterrupted for 30 days) is overlaid, on the receiver used, with the acoustic ambient noise which may be the ocean noise or the specific noise of the search platform including the receiver.

FIG. 1 diagrammatically shows an exemplary timing diagram of two bursts or successive periods 1, 2 of sinusoids with a rectangular envelope transmitted by a "pinger". In the drawing, these two periods are shown close together, but in reality, because the useful period (during which the sinusoids are transmitted) is very small compared to the chopping repetition period (of the order of 1%, for the example cited above), the two successive periods are widely separated from one another.

The current systems for searching for the "black boxes" essentially use sonogram audio (after heterodyning and filtering) and video, and are systems designed to be used in real time by an operator. The detection efficiency of these known systems for searching for the "black boxes" is not always sufficient, particularly in a choppy marine environment. Correlatively, the current approach requires the constant attention of several trained operators for extremely long periods (up to 30 days). Moreover, the playing back of the audio recordings made demands as much time as their acquisition (because it is based on listening).

SUMMARY

The subject of the present invention is a method for detecting series of substantially periodical bursts of substantially sinusoidal signals, in particular, but not exclusively, series of bursts of signals transmitted by "pingers", this method making it possible to ensure the quick and reliable detection of such signals in the presence of significant interference noise. Also the subject of the invention is the accurate location of the transmitters of such signals once their signals have been detected. Also the subject of the invention is the detection of signals coming from equipment transmitting recurrently, such as depth sounders or proximity sonars, and thereby preventing a collision with the carriers of such equipment. The invention has to be able to be implemented regardless of whether or not there is relative motion between the transmitter and the receiver of such signals.

The method according to the invention is characterized in that it comprises the following steps:
  direct detection of the received signal in which the individual bursts have relative phases that are variable and unknown through incoherent integration of this signal, spectral analysis and time integration.

Advantageously, the presentation of the results is done in the form of a two-dimensional image of the successive recurrences of the bursts according to the time slots of the received signals.

According to one feature of the invention, the signals are detected by summation of the energy (incoherent integration) present at the output of the filter:
  the center frequency of which is aligned on the frequency of the carrier,
  the bandwidth of which is greater than or equal to the inverse of the duration of a burst,
  the output rate of which is substantially equal to the duration of a burst (or faster if a time overlap between the analysis periods is desired).

BRIEF DESCRIPTION OF THE DRAWINGS

The present invention will be better understood on reading the detailed description of an embodiment, taken as a non-limiting example and illustrated by the appended drawing in which.

DETAILED DESCRIPTION

Figure 1:
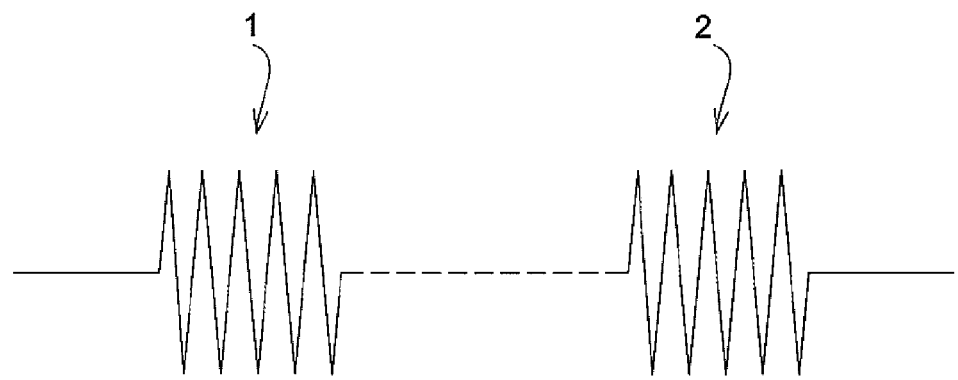
FIG. 1, described above, is an exemplary timing diagram of two successive periods of signals transmitted by a "pinger"

The present invention is described below with reference to the detection of signals transmitted by avionics "pingers", but, obviously, it is not limited to just that application, and it can be implemented for the detection of substantially periodic series of substantially sinusoidal signals (hereinafter called carrier to simplify the description) transmitted by other types of transmitters, such as those of sonars and radars.

To sum up, the method of the invention comprises the following main steps:

slightly delayed processing (typically by 3 minutes) of the received signal, this processing being done by:

spectral analysis of the received signal and its time integration, and, advantageously, the presentation of the results of the preceding step in the form of a two-dimensional image of the successive recurrences of the bursts according to the time slots of the received signals.

The principle of the detection according to the invention essentially comprises the summation by incoherent integration of the energy present at the output of a filter:

the center frequency of which is aligned on the frequency of the carrier, the bandwidth of which is greater than or equal to the inverse of the duration of a burst, the output rate of which is substantially equal to the duration of a burst (or faster if a time overlap between the analysis periods is desired).

The summation of the output energy of the filter is done at the rate of the period of the series of bursts, that is to say that the summation of the output energy of the filter is done at distinct instants of the transmission period.

Even if the pulses arrive periodically (which is not exactly true, as explained below), the initial instant of arrival of a burst in a period is not known. This "initial phase" not being known, and even being variable, the method of the invention consists in implementing the incoherent integration mentioned above by implementing in parallel this integration according to the different possible initial phases.

As an example, if the rate of transmission is 1 second and if the pulse duration is 10 ms, the period of 1 second is subdivided into 100 10 ms "time slots". The filter is implemented by 100 Hz spectral analysis (in practice one FFT every 10 ms). Every 10 ms, there is therefore a value of the energy in the relevant spectral channel, and each second there are 100 values of the energy corresponding to the 100 "time slots". The integration is done at the rate of 1 second in each time slot independently. It is typically possible to integrate N=60 times, which provides an integration gain of the order of 9 dB (of 5 log(N)).

In reality, the detection processing gain in terms of detection sensitivity, compared to a conventional individual spectral detection, is much higher because of the graphic representation mode used by the invention and described below.

Overall, the method used is optimal for detecting a series of pulses in Gaussian noise. It involves the application of the likelihood ratio generalized to the detection of a series of pulses considered as a single signal.

Following the incoherent integration, a graphic representation is produced which helps, at least as much as the incoherent integration, to improve the detection efficiency.

This graphic representation consists of a so-called CT/T (Time Slots/Time) representation in the form of a two-dimensional image in which the horizontal axis represents the "time slots" and the vertical axis the successive recurrences of the bursts.

The presence of the series of bursts is manifested by the appearance of a trace of parabolic form when the receiver and the pinger are in inertial relative motion. The summit of the parabola corresponds to the moment when the distance between the pinger and the receiver is at its minimum (passage through the CPA "Closest Point of Approach"). Such a parabola can be seen in the view of FIG. 2. This FIG. 2 relates to an example for which the CPA is 2000 m, for a sea bottom of 2500 m, a speed of the platform carrying the receiver of 5 knots and a force 4 sea.

It should be noted that this representation offers a number of significant advantages:

It makes it possible to significantly improve the detection of weak (inaudible) signals by the integration gain.

It also makes it possible to unambiguously identify the presence of the phenomenon by the continuity and the form of the trace detected. In fact, this "tri-visual" capability makes it possible to significantly reduce the detection threshold (by more than 7 dB), which also helps to improve the detection distance.

Finally, it provides an accurate quantitative datum concerning the distance of the CPA, which allows for the final location.

The parabolic form of the trace detected stems from the fact that the distance between the pinger and the receiver is a quadratic function of time. The exact formula is given by the analysis of the motion.

If the signal is transmitted at the instant $t_e$ and received at the instant $t_r$, the following applies:

$$c(t_r-t_e)=R(t_r)$$

in which $R(t_r)$ is the distance separating the transmitter from the receiver at the instant of reception.

Now, the following applies:

$$R(t_r)=\sqrt{R_0^2+v^2(t_r-t_0)^2+2vY_0(t_r-t_0)}$$

$R_0=\sqrt{Y_0^2+X_0^2+(H-I)^2}$ is the distance between the pinger and the receiver at the original instant. $X_0$ and $Y_0$ are respectively the value of the CPA and the distance before CPA at the original instant $t_0$. H is the value of the submersion distance of the pinger (generally, its depth) and I is the depth of submersion of the receiver. Finally, v is the speed of the receiver.

From these relationships, the relationship between $t_r$ and $t_e$ can be deduced. By taking $t_0=0$:

$$t_r = \frac{(vY_0 + c^2 t_e) + \sqrt{(vY_0 + c^2 t_e)^2 - (c^2 - v^2)(c^2 t_e^2 - R_0^2)}}{(c^2 - v^2)}$$

Figure 2:
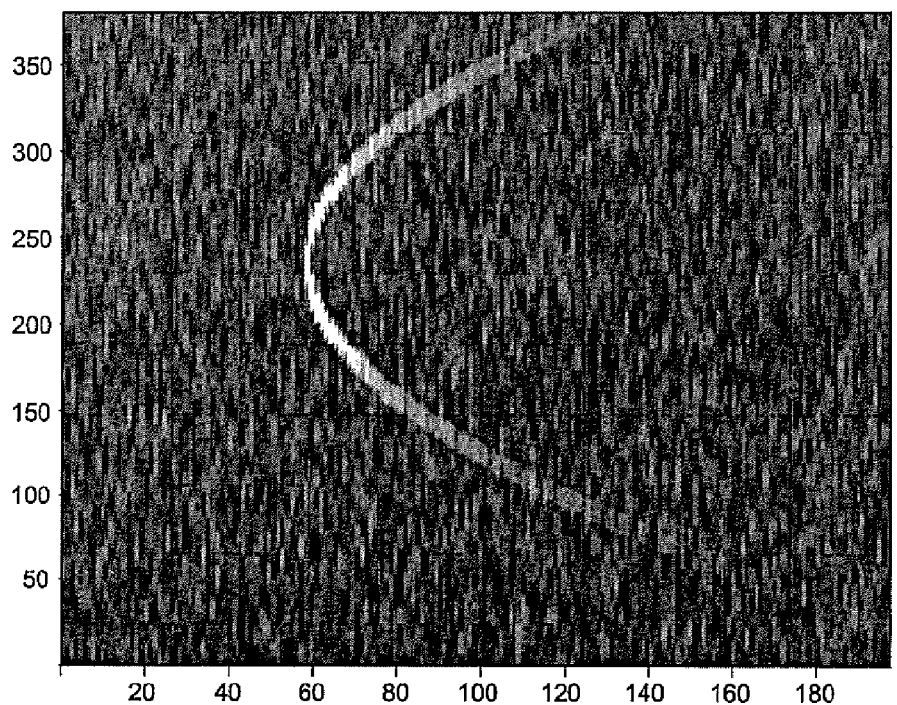
FIG. 2 is a view of a display screen showing a two-dimensional image resulting from the detection of a series of signals by the method according to the present invention.
Figure 3:
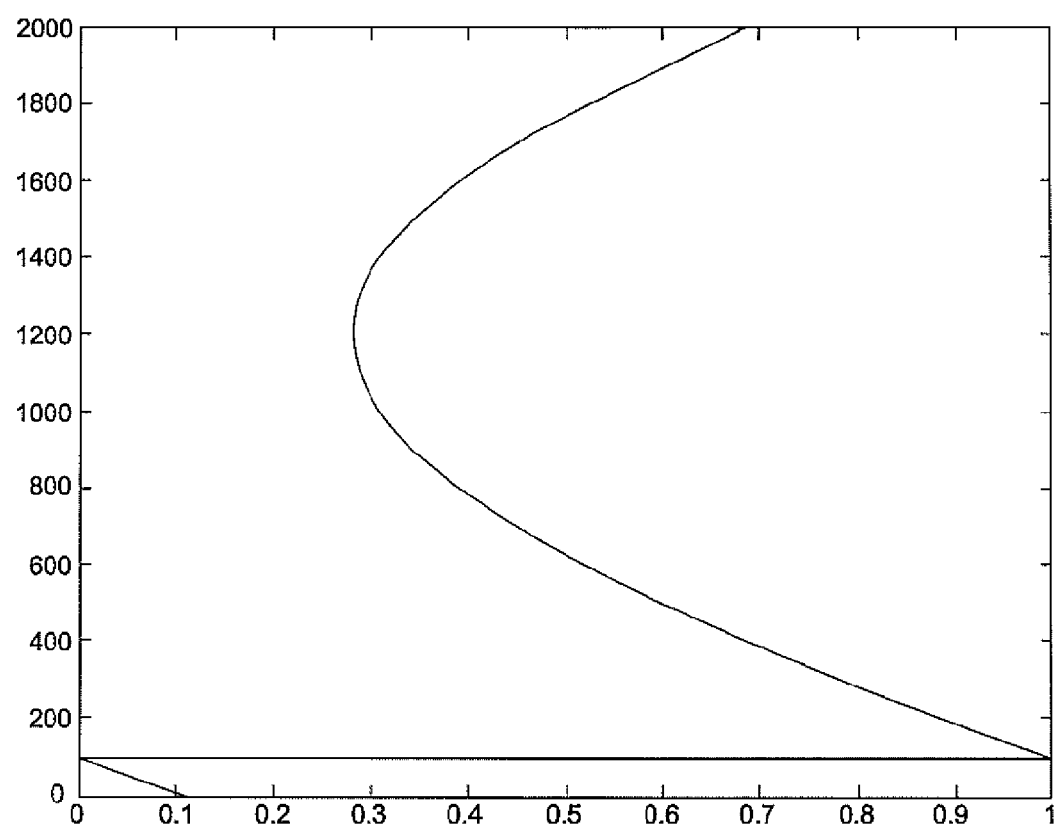
FIG. 3 is a curve representing the relationship between the instant of reception and the instant of transmission of signals by the method according to the present invention.

The curve of FIG. 3 represents the above theoretical expression for the example simulated in FIG. 2, that is to say, the relationship between the instant of reception (on the x axis) and the instant of transmission (on the y axis). It should be noted that the instant of reception is represented modulo the transmission rate (as in FIG. 2).

The Doppler effect (due to the relative motion between the pinger and the receiver) modifies the timescale significantly. In the example explained above, if the receiver approaches the pinger at a speed of 5 knots (2.5 m/s), it perceives the series of pulses at a reduced apparent period of 5/3=1.7 ms/s. This shift means that the incoherent integration is not relevant beyond 6 seconds for this example.

The method of the invention is applicable in an area close to the CPA. This is relevant, for example, when the pinger is submerged at great depth, at the detection limit.

It is, however, possible to improve the detection efficiency by compensating for the Doppler shift and by integrating the energy of the relevant spectral channel, along trajectories of parabolic form in the CT/T plane. The form of these parabolas corresponds to the planned CPA (linked to the speed of the receiver and to the submersion of the pinger).

Thus, by compensating for the Doppler effect, the method of the invention makes it possible:
to implement much greater integration times,
to increase the detection range,
to speed up the search,
to directly determine the CPA of the pinger, which reduces the uncertainty concerning its position at the intersection of a CPA circle and of the depth (ideally known), or two possible points (right-left ambiguity).

Figure 4:
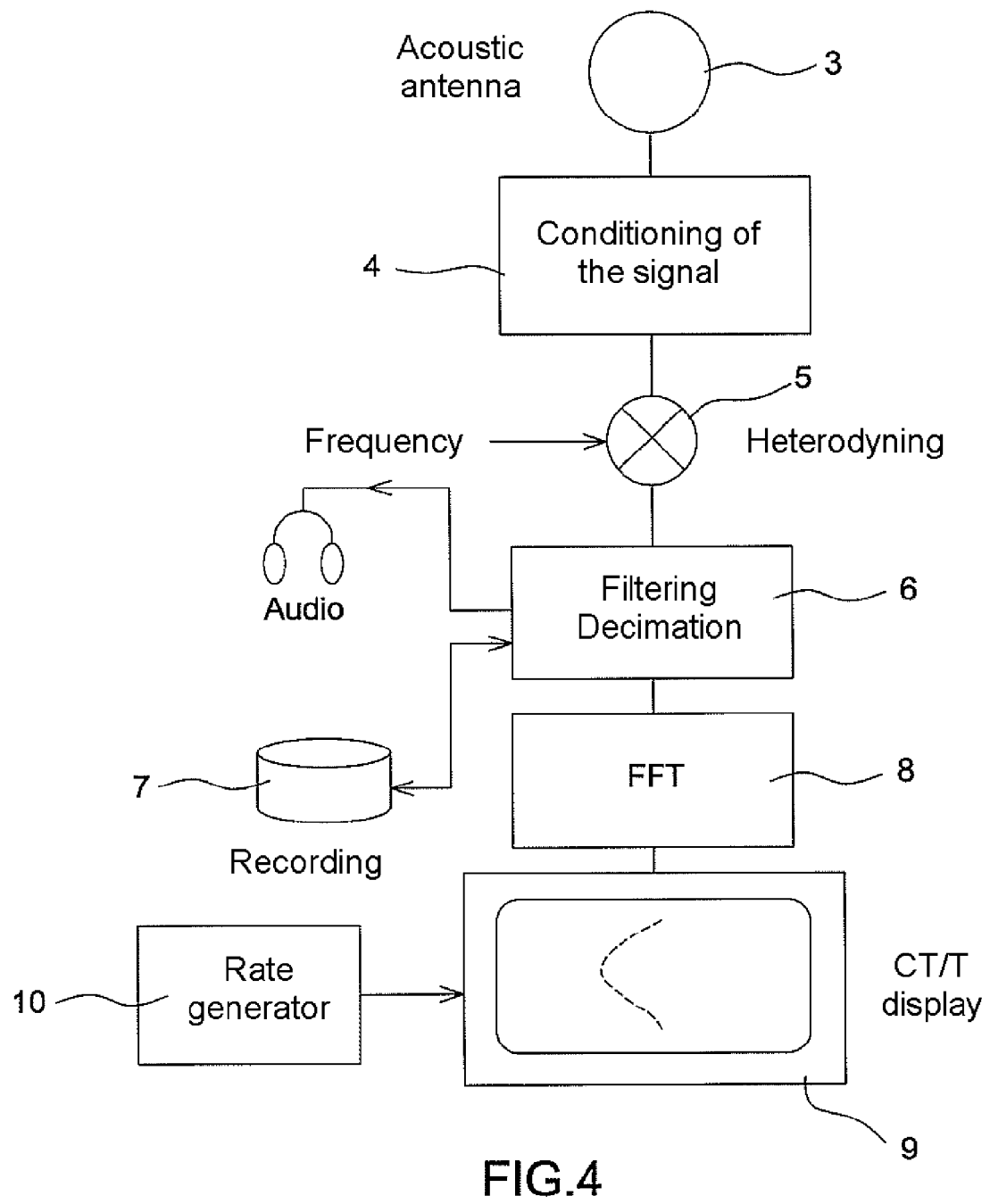
FIG. 4 is the block diagram describing implementation of the method according to the invention from the input of the acoustic signal to the display, and FIG. 5 describes the trajectory of the receiver in a given investigation area according to a procedure for use of the method of the invention in a sea search device.

An exemplary implementation of the method of the invention is represented in FIG. 4. The signal (here acoustic) is supplied in analog form by a sensor which may be a hydrophone or an acoustic antenna 3. This signal is first conditioned (4) before being digitally coded. To do this, it undergoes a filtering and an amplification specifically to adapt it to the characteristics of the analog-digital converter (sampling frequency and input dynamic range). It then undergoes heterodyning (5) and filtering and decimation (6) operations adapted to the characteristics of the pinger to be detected. The aim of these operations is to limit the quantities of data recorded on a recording means (7) during the search operations, while retaining the "play back" capability necessary to the investigations. After decimation, the signal undergoes a spectral analysis (8) (for example, by fast Fourier transform) according to a time and frequency resolution suited to the pinger being sought. The visual representation (9) is then generated from these data and from complementary setting parameters, more particularly the rate and integration time. The rate is either fixed by the operator, or generated by a scanning machine (10) which makes it possible to present on the screen (9) the various possible rates (in the form of a fast animation).

Figure 5:
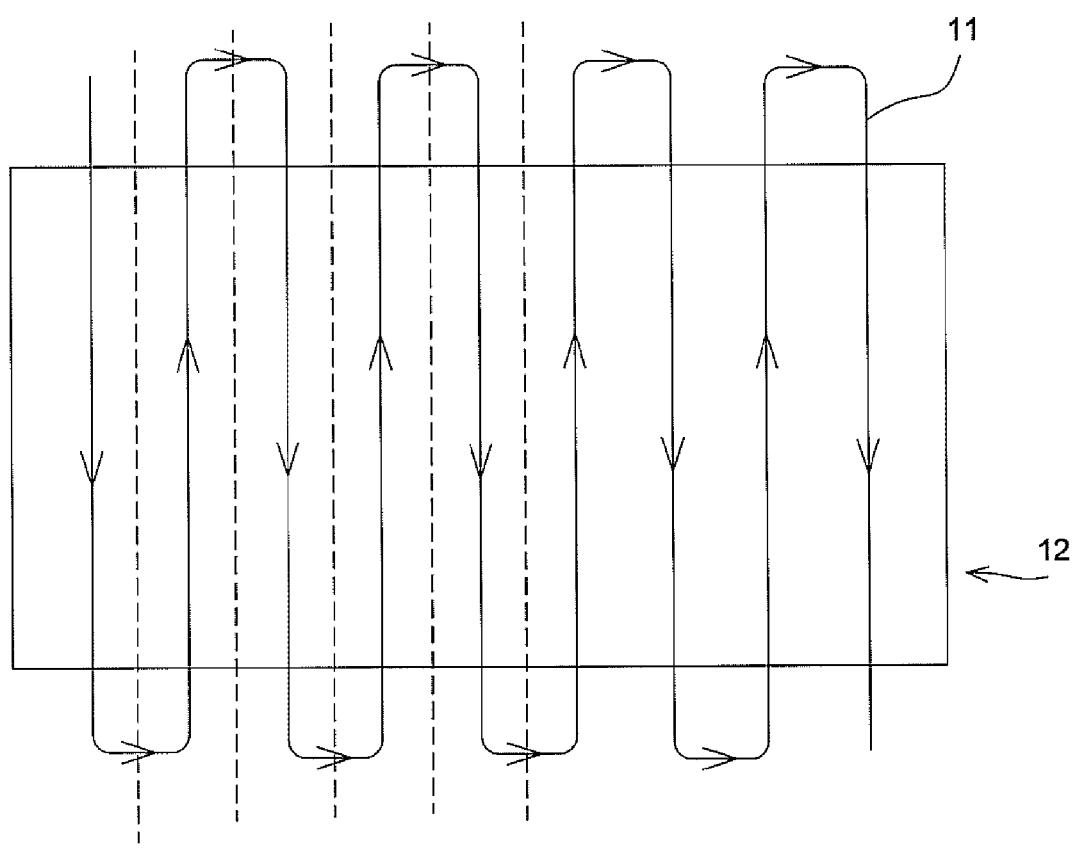

The method of the invention is relevant to a systematic search procedure in which the platform supporting the receiver executes a conventional search pattern 11 in the form of a rake. The gap between the branches of this rake is linked to the detection efficiency of the method in the context of use (that is to say, the submersion of the pinger, the noise at the receiver and the antenna gain). FIG. 5 illustrates an example of the form of this "rake" pattern in a previously delimited exploration area 12 (of rectangular form in FIG. 5).

The method of the invention needs to know the frequency of the pinger and its transmission rate. If these parameters are unknown, this only means that they also have to be searched for systematically. In this case, it is preferable to record the received signals and process them, preferably in accelerated time, based on the various possible assumptions concerning the frequency of the pinger and its transmission rate.

It should be noted, however, that, in the aeronautical context, the parameters of the pinger are measured and listed. It is therefore possible to then envisage a "real time" use of the method, while at the same time taking a recording of the data.

According to a variant of the invention, which can be implemented to detect a signal transmitter of the abovementioned type (series of bursts of sinusoidal signals) and to approximately locate it within an area, in particular a marine (or lacustrine) area, that is fairly wide, but with the position of said transmitter being known approximately beforehand, there are one or more fixed receivers available, which are each fixed to a buoy and submerged in the case of a marine or lacustrine area, this or these receiver(s) being in communication with a remote control station.

The invention claimed is:

1. A method for detecting series of substantially periodic bursts of substantially sinusoidal received signals, the method comprising:
   direct detection for the received signals in which the individual burst have relative phases that are variable and unknown through incoherent integration of the signals, and
   spectral analysis and time integration,
   wherein the signals are detected by summation of energy present at an output of a filter, a center frequency of which is aligned on a frequency of a carrier, a bandwidth of which is greater than or equal to an inverse of a duration of a burst, and a output rate of which is substantially equal to the duration of a burst, or faster.

2. The method according to claim 1, further comprising presentation of results of the spectral analysis and time integration in the form of two-dimensional image of successive recurrences of the bursts according to time slots of the received signals.

3. The method according to claim 1, wherein
   the method is applied to a receiver having a relative motion in relation to the transmitter of the signals, and
   the time integration is performed according to Doppler trajectories so that the integration time can be increased.

4. The method according to claim 1, wherein
   a frequency of transmission and a rate of transmission of the bursts are unknown,
   the frequency of transmission and the rate of transmission are sought systematically, and
   the received signals are recorded and are processed according to different possible assumptions concerning the frequency and the rate of transmission.

5. The method according to claim 1, wherein a transmitter and a receiver are at fixed locations, and the method further comprises detection of the transmitter and its approximate location in an area for which the position is known approximately beforehand.

6. The method according to claim 1, wherein an area of concern is a marine or lacustrine area and a receiver is submerged and fixed to a buoy.

* * * * *